US010504217B2

(12) United States Patent
Kang et al.

(10) Patent No.: US 10,504,217 B2
(45) Date of Patent: Dec. 10, 2019

(54) METHOD AND MODULE FOR PROCESSING HIGH DYNAMIC RANGE (HDR) IMAGE AND DISPLAY DEVICE USING THE SAME

(71) Applicant: LG DISPLAY CO., LTD., Seoul (KR)

(72) Inventors: Yoo-Jin Kang, Seoul (KR); Sung-Jin Kim, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 120 days.

(21) Appl. No.: 15/700,847

(22) Filed: Sep. 11, 2017

(65) Prior Publication Data
US 2018/0122058 A1 May 3, 2018

(30) Foreign Application Priority Data

Oct. 31, 2016 (KR) .................. 10-2016-0143894

(51) Int. Cl.
*G06K 9/40* (2006.01)
*G06T 5/00* (2006.01)
(Continued)

(52) U.S. Cl.
CPC .............. *G06T 5/009* (2013.01); *G06T 5/50* (2013.01); *G06T 7/136* (2017.01); *G09G 3/2092* (2013.01);
(Continued)

(58) Field of Classification Search
CPC . G06T 2207/20208; G06T 5/009; G06T 5/50; G06T 7/136; G09G 2320/0271;
(Continued)

(56) References Cited

U.S. PATENT DOCUMENTS 10,148,907 B1 * 12/2018 Wu .................... G06T 5/007
2014/0002478 A1 * 1/2014 Ballestad ............ H04N 1/6027
345/589

(Continued)

FOREIGN PATENT DOCUMENTS

WO WO 2016/074999 A1 5/2016

OTHER PUBLICATIONS

Sullivan et al., "Report of Question 6/16 "Visual coding"," Rapporteur Q6/16, International Telecommunication Union, Study Group 16, Telecommunication Standardization Sector, TD 215 R1 (WP3/16), Study Period 2013-2016, Geneva, Oct. 12-23, 2015, pp. 1-24.

*Primary Examiner* — Bhavesh M Mehta
*Assistant Examiner* — Ian L Lemieux
(74) *Attorney, Agent, or Firm* — Birch, Stewart, Kolasch & Birch, LLP

(57) ABSTRACT

A method, display device and module for processing a high dynamic range (HDR) image are discussed. The method can include converting gray level information of a first HDR image into luminance information using a perceptual quantizer electro-optical transfer function (PQ-EOTF), and adjusting the luminance information according to illuminance information to obtain luminance information of a second HDR image; analyzing the luminance information of the second HDR image, and calculating a high-luminance rate of occupancy of pixels having a target peak luminance or more of a display device in the second HDR image; luminance-mapping the second HDR image to a third HDR image suitable for the display device using a mapping function changed according to the high-luminance rate; and converting luminance information of the third HDR image into gray level information of a fourth HDR image using a perceptual quantizer opto-electrical transfer function (PQ-
(Continued)

OETF), and outputting the gray level information of the fourth HDR image.

20 Claims, 6 Drawing Sheets

(51) Int. Cl.
| | | |
|---|---|---|
| | *G06T 7/136* | (2017.01) |
| | *G06T 5/50* | (2006.01) |
| | *H04N 5/232* | (2006.01) |
| | *G09G 3/20* | (2006.01) |
| | *H04N 5/58* | (2006.01) |
| | *G09G 5/00* | (2006.01) |

(52) U.S. Cl.
CPC ........... *H04N 5/23293* (2013.01); *H04N 5/58* (2013.01); *G06T 2207/20208* (2013.01); *G09G 5/005* (2013.01); *G09G 5/006* (2013.01); *G09G 2320/0271* (2013.01); *G09G 2320/06* (2013.01); *G09G 2320/062* (2013.01); *G09G 2320/066* (2013.01); *G09G 2320/0666* (2013.01); *G09G 2320/0673* (2013.01); *G09G 2360/144* (2013.01); *G09G 2360/16* (2013.01)

(58) Field of Classification Search
CPC ......... G09G 2320/06; G09G 2320/062; G09G 2320/066; G09G 2320/0666; G09G 2320/0673; G09G 2360/144; G09G 2360/16; G09G 3/2092; G09G 5/005; G09G 5/006; H04N 5/23293; H04N 5/58
See application file for complete search history.

(56) References Cited

U.S. PATENT DOCUMENTS

| | | | |
|---|---|---|---|
| 2015/0325208 | A1 | 11/2015 | Tusch |
| 2016/0358584 | A1* | 12/2016 | Greenebaum ............ G09G 5/02 |
| 2017/0006273 | A1* | 1/2017 | Borer ........................ H04N 9/77 |
| 2017/0034519 | A1* | 2/2017 | Rosewarne ............ H04N 19/85 |
| 2017/0034520 | A1* | 2/2017 | Rosewarne ........ H04N 19/1887 |
| 2017/0078706 | A1* | 3/2017 | Van Der Vleuten ..... H04N 5/20 |
| 2017/0085889 | A1* | 3/2017 | Baylon ................ H04N 19/124 |
| 2017/0085894 | A1* | 3/2017 | Ramasubramonian ..................... H04N 19/46 |
| 2017/0330529 | A1* | 11/2017 | Van Mourik ............ H04N 5/20 |
| 2018/0367819 | A1* | 12/2018 | Van Der Vleuten ..... H04N 5/20 |

* cited by examiner (A) HDR ORIGINAL  (B) OUTDOOR ILLUMINANCE ENVIRONMENT  (C) ILLUMINANCE WEIGHT APPLICATION

METHOD AND MODULE FOR PROCESSING HIGH DYNAMIC RANGE (HDR) IMAGE AND DISPLAY DEVICE USING THE SAME

CROSS-REFERENCE TO RELATED APPLICATIONS

This application claims the priority benefit of Korean Patent Application No. 10-2016-0143894, filed on Oct. 31, 2016 in Republic of Korea, which is hereby incorporated by reference in its entirety.

BACKGROUND OF THE INVENTION

Field of the Invention

The present invention relates to a method and module for processing a high dynamic range (HDR) image, which are capable of improving visibility according to illuminance, and a display device using the same.

Discussion of the Related Art

Human beings can perceive a wide brightness range of about $10^{-6}$ to $10^8$ nits ($cd/m^2$) and high dynamic range (hereinafter, HDR) technology considering the same has extended to image creation, display development, etc., in addition to photography.

An HDR image is encoded using a perceptual quantizer opto-electrical transfer function (hereinafter, PQ-OETF) defined by the society of motion picture and television engineers (SMPTE) ST. 2084 and has a high dynamic range of 0 to 10,000 nits.

A display device needs to perform an image processing procedure using a perceptual quantizer electro-optical transfer function (PQ-EOTF) defined in SMPTE ST. 2084, in order to display an HDR image.

However, since the PQ-EOTF used in the image processing procedure of the display device is derived in a dark room, a just-noticeable difference (JND) in a bright room is not applied.

To this end, when the display device displays an HDR image subjected to the image processing procedure using the PQ-EOTF in a bright room, a luminance saturation phenomenon wherein gray-level banding is caused in a high luminance region of an image is generated, deteriorating visibility.

SUMMARY OF THE INVENTION

Accordingly, the present invention is directed to a method and module for processing a high dynamic range (HDR) image and a display device using the same and that substantially obviate one or more problems due to limitations and disadvantages of the related art.

An object of the present invention is to provide a method and module for processing an HDR image, which are capable of adaptively improving visibility of the HDR image according to illuminance, and a display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In the method and module for processing the image according to one embodiment, illuminance information sensed through an illuminance sensor is received, gray level information of a first HDR image is converted into luminance information using a perceptual quantizer electro-optical transfer function (PQ-EOTF), and the luminance information is adjusted using the illuminance information to generate luminance information of a second HDR.

In the method and module for processing the image according to one embodiment, the luminance information of the second HDR image is analyzed to calculate a high-luminance rate of occupancy of pixels having target peak luminance or more of a display device in the second HDR image.

In the method and module for processing the image according to one embodiment, the second HDR image is luminance-mapped to a third HDR image suitable for the display device using a mapping function changed according to the high-luminance rate.

In the method and module for processing the image according to one embodiment, luminance information of the third HDR image is converted into gray level information of a fourth HDR image using a perceptual quantizer opto-electrical transfer function (PQ-OETF) and the gray level information is output.

In the method and module for processing the image according to one embodiment, when the high-luminance rate exceeds a threshold, a first linear mapping function is used in a first luminance part having the target peak luminance or less of the second HDR image and a second non-linear mapping function is used in a second luminance part having the target peak luminance or more, and, when the high-luminance rate is equal to or less than the threshold, the first mapping function is used.

In the method and module for processing the image according to one embodiment, when the high-luminance rate exceeds the threshold, luminance of the second luminance part of the second HDR image increases according to the second mapping function in a range between the target peak luminance of the display device and a maximum luminance of the display device, and, when the high-luminance rate is equal to or less than the threshold, the second luminance part of the second HDR image is mapped to the target peak luminance.

A display device of one embodiment uses the above-described image processing module.

In the embodiment of the present invention, the PQ-EOTF curve is adjusted according to illuminance to adjust the luminance of the HDR image, and, if the high-luminance rate of the adjusted HDR image is equal to or greater than the threshold, the luminance of the high-luminance part equal to or greater than the target peak luminance of the display device increases to increase gray-level distinguishability of the HDR image and to reduce luminance saturation, thereby improving visibility and image quality.

The display device according to the embodiment of the present invention displays the HDR image with luminance equal to or less than the target peak luminance of the display device if the high-luminance rate of the HDR image adjusted according to illuminance is less than the threshold, thereby improving visibility and maintaining power consumption.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE EMBODIMENTS

Figure 1:
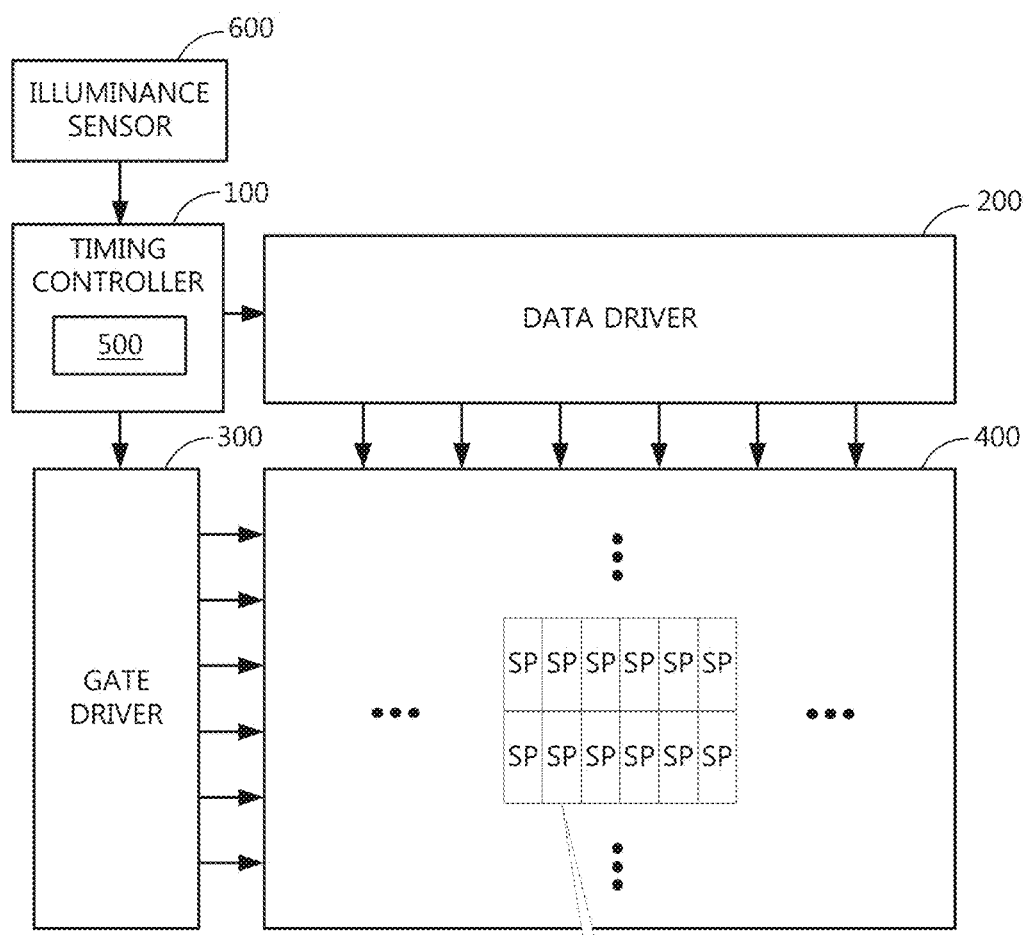
FIG. 1 is a schematic block diagram showing the configuration of an HDR display device according to an embodiment of the present invention.
Figure 2:
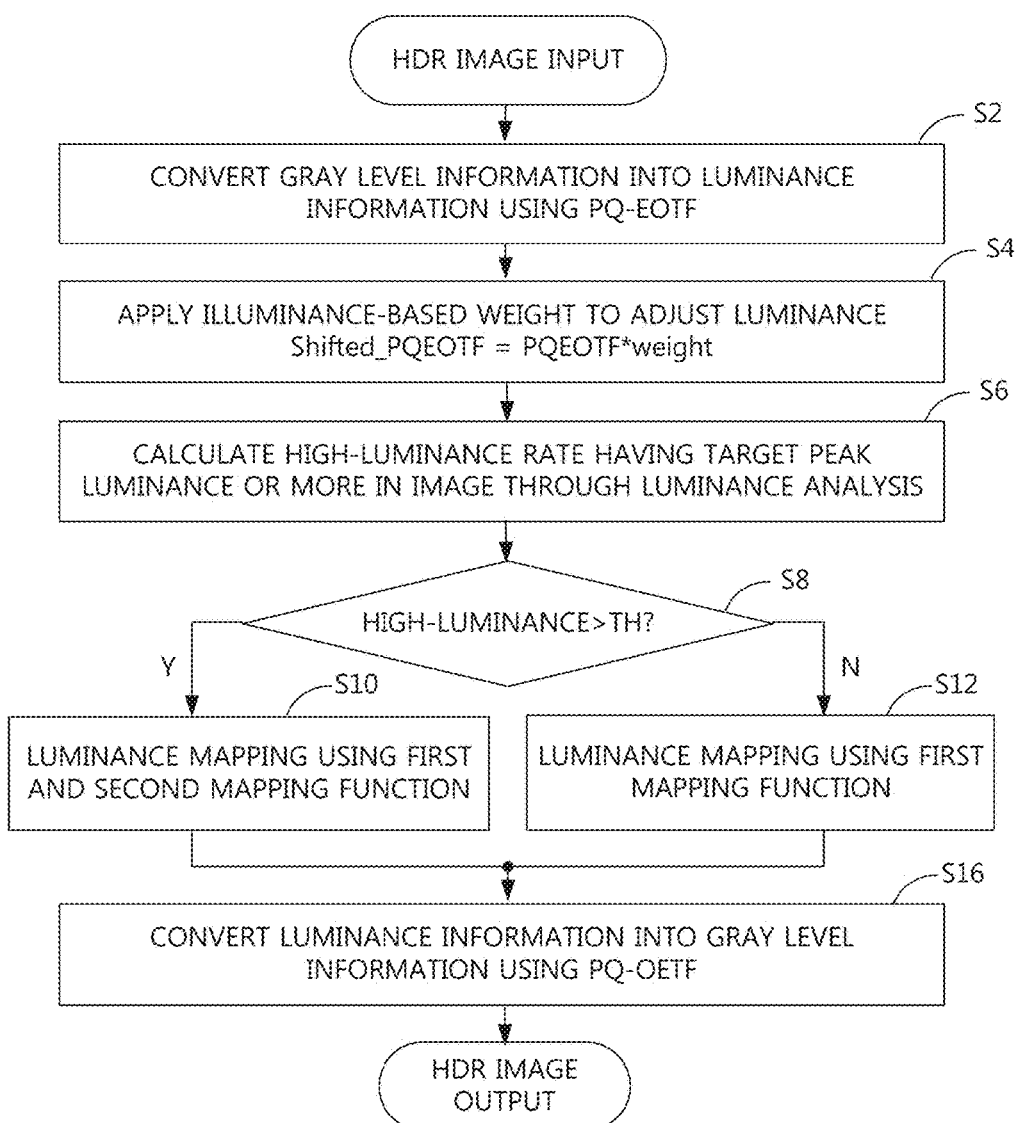
FIG. 2 is a flowchart illustrating an HDR image processing method according to an embodiment of the present invention.

FIG. 1 is a schematic block diagram showing the configuration of an HDR display device according to an embodiment of the present invention. FIG. 2 is a flowchart illustrating an HDR image processing method according to an embodiment of the present invention. All the components of the HDR display device according to all embodiments of the present invention are operatively coupled and configured.

The HDR display device shown in FIG. 1 includes a timing controller 100 having an image processing module 500, a data driver 200 and a gate driver 300 as panel drivers, a display panel 400, the image processing module 500, an illuminance sensor 600, a power supply, a gamma voltage generator, etc.

The display panel 400 displays an image through a pixel array in which pixels are arranged in a matrix. Basic pixels may be composed of at least three subpixels (W/R/G, B/W/R, G/B/W, R/G/B or W/R/G/B) enabling white expression by color mixture of white (W), red (R), green (G) and blue (B) subpixels.

As the display panel 400, a liquid crystal display (LCD) panel or an organic light emitting diode (OLED) panel may be used. Hereinafter, assume that the display panel 400 is an OLED panel.

If the display panel 400 is an OLED panel, each subpixel SP includes an OLED element connected between the supply line PL1 of a high voltage EVDD and the supply line PL2 of a low voltage EVSS and a pixel circuit including at least first and second switching TFTs ST1 and ST2, a driving TFT DT and a storage capacitor Cst in order to independently drive the OLED element, as shown in FIG. 1. The configuration of the pixel circuit is various and is not limited to the structure of FIG. 1.

The OLED element includes an anode connected to the driving TFT DT, a cathode connected to the supply line PL2 of the low voltage EVSS, and a light emitting layer between the anode and the cathode and emits light in proportion to the amount of current supplied through the driving TFT DT.

The first switching TFT ST1 is driven by the gate signal of one gate line GLa to supply a data voltage from a data line DL to the gate electrode of the driving TFT DT and the second switching TFT ST2 is driven by the gate signal of another gate line GLb to supply a reference voltage from a reference line RL to the source electrode of the driving TFT DT. The second switching TFT ST2 may be further used as a path for outputting current from the driving TFT (DT) to the reference line RL in a sensing mode.

The storage capacitor Cst connected between the gate electrode and the source electrode of the driving TFT DT supplies a differential voltage between the data voltage supplied to the gate electrode through the first switching TFT ST1 and the reference voltage supplied to the source electrode through the second switching TFT ST2 as driving voltage of the driving TFT DT.

The driving TFT DT controls current received from the supply line PL1 of the high voltage EVDD according to the driving voltage received from the storage capacitor Cst to supply current proportional to the driving voltage to the OLED element, thereby enabling the OLED element to emit light.

The data driver 200 receives a data control signal and image data from the timing controller 100. The data driver 200 is driven according to the data control signal to divide a reference gamma voltage set received from the gamma voltage generator into gray-level voltages, converts digital image data into analog data signals using the divided gray-level voltages and supplies the analog data signals to the data lines of the display panel 400.

The data driver 200 includes a plurality of data drive ICs for divisionally driving the data lines of the display panel 400. Each data drive IC may be mounted on a circuit film such as a tape carrier package (TCP), a chip on film (COF) or a flexible printed circuit (FPC) to be attached to the display panel 400 using a tape automated bonding (TAB) method or to be mounted on the display panel 400 using a chip on glass (COG) method.

The gate driver 300 drives the plurality of gate lines of the display panel 400 using a gate control signal received from the timing controller 100. The gate driver 300 supplies a scan pulse of a gate on voltage to each gate line in a scan period in response to the gate control signal and supplies a gate off voltage in the other period.

The gate driver 300 may include at least one gate IC and may be mounted on a circuit film such as a TCP, a COF or an FPC to be attached to the display panel 400 using a TAB method or to be mounted on the display panel 400 using a COG method. Alternatively, the gate driver 300 may be formed on a TFT substrate along with a TFT array configuring the pixel array of the display panel 400 to be provided in a non-display region of the display panel 400 in a gate-in-panel (GIP) type.

The illuminance sensor 600 is mounted in the display device to sense the external illuminance of the display device and to supply the sensed illuminance information to the image processing module 500.

The timing controller 100 receives HDR image data, a timing signal, etc., from an external system. The timing controller 100 controls the driving timings of the data driver 200 and the gate driver 300 using the received timing signals. The input timing signal includes a dot clock, a data enable signal, a vertical synchronization signal and a horizontal synchronization signal. The vertical synchronization signal and the horizontal synchronization signal may be omitted. In this case, the timing controller 100 may count the data enable signal according to the dot clock to generate and use the vertical synchronization signal and the vertical synchronization signal. The data control signals for controlling driving of the data driver 200 may include a source start pulse, a source sampling clock, a source output enable signal, etc. The gate control signals for controlling driving of the gate driver 300 may include a gate start pulse, a gate shift clock, a gate output enable signal, etc.

The timing controller 100 performs a variety of image processing procedures with respect to the HDR image using the image processing module 500 and supplies the image-processed data to the data driver 200. The image processing module 500 may be implemented in the timing controller 100 by hardware or may mean a software image processing module stored in a memory. Meanwhile, the image processing module 500 may be provided as a separate IC separately from the timing controller 100. In this case, the image processing module 500 may be located at a previous stage of the timing controller 100.

Hereinafter, the image processing method of the image processing module 500 will be described with reference to FIGS. 1 and 2.

The image processing module 500 converts the HDR image into luminance information using a PQ-EOTF (S2) and adjusts the luminance information by applying an illuminance-based weight (S4). As illuminance increases, the weight increases and thus luminance of the HDR image increases. Therefore, visibility of the HDR image displayed on the display device is improved.

The image processing module 500 analyzes the HDR image, the luminance of which is adjusted according to illuminance, to calculate a high-luminance rate of occupancy of a high-luminance part having a target peak or more of the display device in the image (S6).

In general, the OLED display device implements white with target peak luminance lower than maximum luminance using three-color subpixels (W/R/G, B/W/R, G/B/W or R/G/B) among four-color (W/R/G/B) subpixels in order to adjust a color temperature. For example, when the maximum luminance (rating value) of the OLED display device is 800 nits, target peak luminance may be set to 540 nits.

The image processing module 500 uses a first mapping function in a first luminance part having a target peak or less and selectively uses a second mapping function for increasing luminance according to the high-luminance rate of the HDR image in a second luminance part having the target peak or more, when luminance-mapping the dynamic range of the HDR image to the dynamic range of the display device.

More specifically, the image processing module 500 maps the first luminance part having the target peak or less using the first mapping function and increases the luminance of the second luminance part (high-luminance part) having the target peak or more to the maximum luminance (rating value) of the display device using the second non-linear mapping function (S10), when the high-luminance rate of the HDR image exceeds the threshold (S8, Y). Therefore, distinguishability among the gray levels of the high-luminance part may be increased and luminance saturation may be reduced, thereby improving the quality of the HDR image.

In contrast, the image processing module 500 maps the first luminance part having the target peak or less using the first mapping function and clips the luminance of the second luminance part (high-luminance part) having the target peak or more to the target peak luminance without using the second mapping function (S12), when the high-luminance rate of the HDR image is less than the threshold. Therefore, the HDR image is displayed with the target peak luminance or less, thereby maintaining power consumption.

The image processing module 500 converts the luminance information of the HDR image mapped to the dynamic range of the display device into gray level information through the PQ-OETF which is an inverse function of the PQ-EOTF and supplies the gray level information to the data driver 200 (S16).

The image processing module 500 may further perform an image preprocessing procedure such as conversion of three-color (RGB) data of the HDR image into four-color (WRGB) data before the above-described image processing procedure.

The display device according to the embodiment of the present invention may adjust the luminance of the HDR image according to illuminance and increase the luminance of the high-luminance part when the high-luminance rate of the adjusted HDR image is equal to or greater than the threshold, thereby increasing gray level distinguishability of the HDR image and reducing luminance saturation. Therefore, it is possible to improve visibility and image quality. The display device according to the embodiment of the present invention may display the HDR image with the target peak or less when the high-luminance rate of the HDR image adjusted according to illuminance is less than the threshold, thereby improving visibility and maintaining power consumption.

Figure 3:
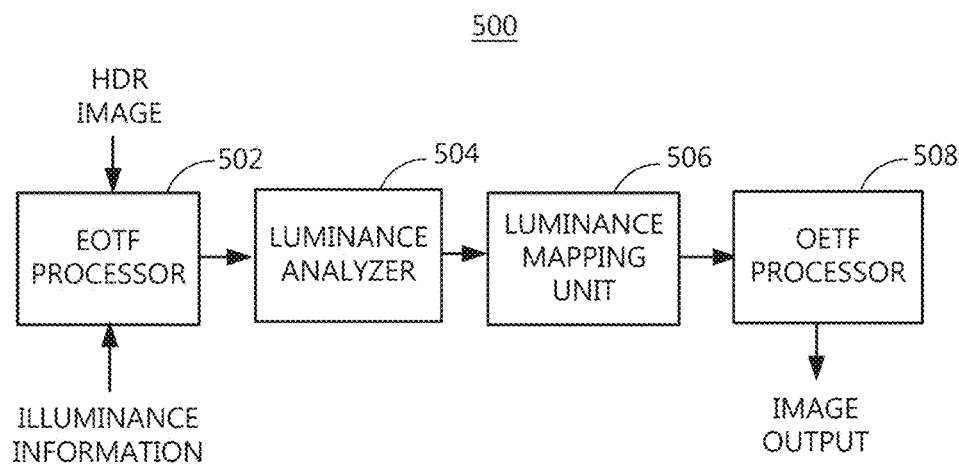
FIG. 3 is a block diagram showing an HDR image processing module according to an embodiment of the present invention.
Figure 4:
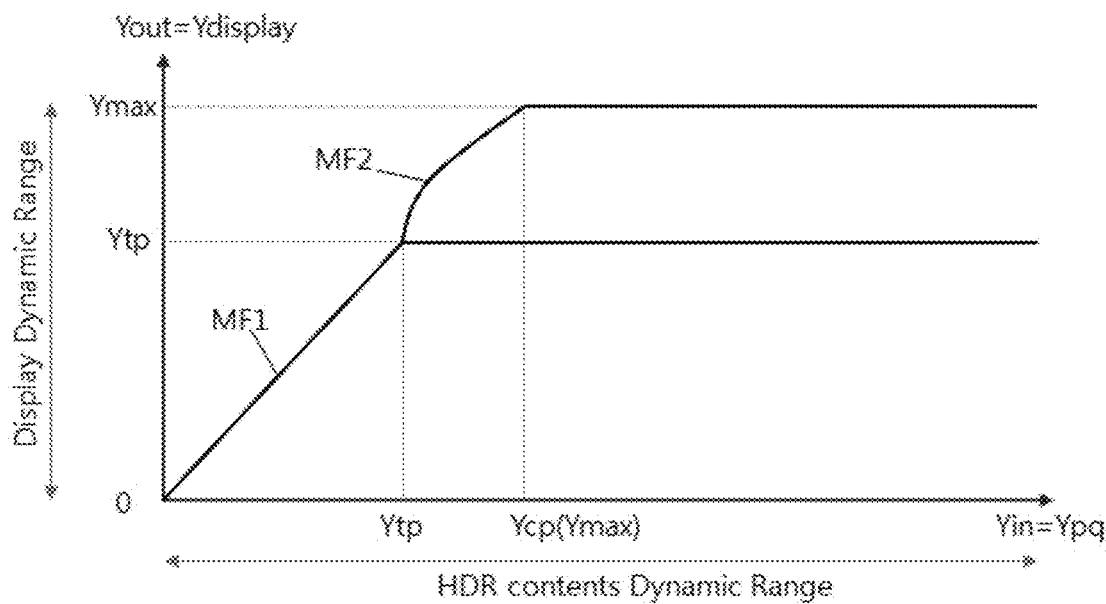
FIG. 4 is a graph showing a luminance mapping function according to an embodiment of the present invention.

FIG. 3 is a block diagram showing an HDR image processing module according to an embodiment of the present invention. FIG. 4 is a graph showing a luminance mapping function according to an embodiment of the present invention.

The image processing module 500 shown in FIG. 3 includes an EOTF processor 502, a luminance analyzer 504, a luminance mapping unit 506 and an OETF processor 508. The terms "unit" and "-or"/"-er" described in the specification indicate a block for processing at least one function or operation, which may be implemented by hardware or may mean a software image processing module stored in a memory.

The EOTF processor 502 converts the gray level information of the received HDR image into luminance information using the PQ-EOTF including Equations 1 and 2 below and adjusts the luminance information by applying a weight according to illuminance information received from the illuminance sensor 600.

$$L = \left( \frac{\max[(N^{1/m_2} - c_1), 0]}{c_2 - c_3 N^{1/m_2}} \right)^{1/m_1} \qquad \text{Equation 1}$$

$$C = 10000L \qquad \text{Equation 2}$$

In Equation 1, N denotes a non-linear color value, which means a value obtained by dividing the color gray level value of each subpixel by a maximum value (e.g., 1,023 in the case of 10 bits) decided by bit-depth and performing normalization with 0 to 1, and L denotes a linear color value in a range of 0 to 1. m1 to m2 and c1 to c3 are constants. For example, m1=(2610/4096)×(¼)=0.1593017578125, m2=(2523/4096)×128=78.84375, c1=3424/4096=0.8359375=c3−c2+1, c2=(2413/4096)×32=18.8515625, and c3=(2392/4096)×32=18.6875.

The EOTF processor 502 converts the gray level information of each subpixel into a linear color value L using Equation 1 and scales the linear color value L to absolute luminance C in an HDR range of 0 to 10,000 nits, thereby converting the gray level information of each subpixel into the luminance information.

The EOTF processor 502 multiplies the luminance information of each subpixel by the weight according to the illuminance information to perform adjustment. A look-up table (LUT) having a weight changed according to illuminance section information received from the illuminance sensor 600 is stored in the memory used in the image processing module 500. The EOTF processor 502 selects a weight according to the illuminance section information from the LUT, multiplies the luminance information of each subpixel by the selected weight and adjusts the luminance information according to illuminance. As illuminance increases, the weight increases and thus luminance increases. Even when the illuminance is high, visibility is improved.

The luminance analyzer 504 analyzes the luminance information of the HDR image received from the EOTF processor 502 and calculates the high-luminance rate of occupancy of the high-luminance part having target peak luminance or more of the display device in the HDR image. The luminance analyzer 504 analyzes the luminance information of the HDR image at least in frame units and counts the number of high-luminance pixels having target peak luminance or more in the image. The luminance analyzer 504 calculates the ratio of the number of high-luminance pixels to the total number of pixels and outputs the high-luminance rate. The luminance analyzer 504 may detect a maximum value of the luminance values of the subpixels of each pixel as a representative value of each pixel, compare the representative value of each pixel with the target peak luminance, and count pixels having the representative value equal to or greater than the target peak luminance as high-luminance pixels.

The luminance mapping unit 506 receives the HDR image and the high-luminance rate from the luminance analyzer 504. The luminance mapping unit 506 maps the luminance information of the HDR image to the dynamic range of the display device according to the high-luminance rate.

More specifically, the luminance mapping unit 506 divides the absolute luminance of the HDR image, which is the input luminance Yin before luminance mapping, by the maximum luminance Ymax_display of the display device and performs conversion into normalized luminance (relative luminance) Ypg. The luminance mapping unit 506 maps the input luminance Yin corresponding to the normalized luminance Ypq of the HDR image to output luminance Yout corresponding to the normalized luminance Ydisplay of the display device using a mapping function changed according to the high-luminance rate. For example, if the maximum luminance of the display device is 800 nits, the normalized luminance Ypq of the HDR has a range of 0 to 12.5 and the normalized luminance Ydisplay of the display device has a range of 0 to 1.

The luminance mapping unit 506 maps the input luminance Yin of the HDR image to the output luminance Yout of the display device using the mapping function shown in FIG. 4. The mapping function includes first and second mapping functions MF1 and MF2 divided according to the target peak luminance Ytp of the display device. The luminance mapping unit 506 selectively applies the second mapping function MF2 according to the high-luminance rate.

For example, if the maximum luminance of the display device is 800 nits and the target peak is 540 nits, in the mapping function shown in FIG. 4, the target peak point Ytp may become 540/800=0.675.

The luminance mapping unit 506 maps the input luminance Yin to the output luminance Yout using the first and second mapping function MF1 and MF2 or maps the input luminance Yin to the output luminance Yout using the first mapping function, depending on whether the high-luminance ratio exceeds a threshold TH.

If the high-luminance rate of the HDR image is equal to or less than the threshold TH, the luminance mapping unit 506 maps the input luminance Yin to the output luminance Yout using the first mapping function (MF1: Yout=kYin). If the gradient k is set to 1 in the first mapping function MF1, the output luminance Yout of the display device, to which the input luminance Yin of the subpixel belonging to the target peak luminance Ytp or less is mapped, may be equal to the input luminance Yin. The luminance mapping unit 506 maps the input luminance Yin of the subpixel exceeding the target peak luminance Ytp to the target peak luminance Ytp of the display device. Therefore, the luminance having the target peak of the HDR image is displayed in a state of being clipped to the target peak luminance of the display device, thereby maintaining power consumption.

If the high-luminance rate of the HDR image exceeds the threshold TH, the luminance mapping unit 506 maps the input luminance Yin to the output luminance Yout using the first and second mapping functions MF1 and MF2. The luminance mapping unit 506 maps the input luminance Yin of the subpixel belonging to the target peak luminance Ytp or less to the output luminance Yout using the first linear mapping function MF1 (Yout=kYin), as described above.

The luminance mapping unit 506 maps the input luminance Yin of the subpixel belonging to the high-luminance part between the target peak luminance Ytp and the maximum luminance Ymax to the output luminance Yout which gradually increases in a range between the target peak luminance Ytp of the display device and the maximum luminance Ymax using the second non-linear mapping function MF2. Therefore, the luminance of the HDR image is increased such that the gray levels are distinguishable without saturation of the high-luminance part between the target peak luminance Ytp and the maximum luminance Ymax, thereby improving the quality of the HDR image.

The second non-linear mapping function MF2 shown in FIG. 4 may be defined as shown in Equation 3 below.

$$Yout = Ytp + a(Yin - Ytp)^{1/b}$$

$$a = (1 - Ytp)/(Ycp - Ytp)^{1/b} \qquad \text{Equation 3}$$

In Equation 3, Ytp denotes normalized target peak luminance of the display device, Ycp denotes normalized clipping luminance of the input luminance Yin, b is a constant. As the b value decreases, a curve becomes gradual. Therefore, the b value is set to a value capable of obtaining a natural curve through experimentation. The clipping luminance Ycp of the input luminance Yin is obtained by dividing the maximum luminance of the HDR image by the maximum luminance of the display device and performing normalization. The maximum luminance of the HDR image is 10000 nits. In consideration of the luminance limit of the display device, when dividing 4,000 nits which are generally used upon mastering of a content creation company by the maximum luminance (e.g., 800 nits) of the display device and performing normalization, the clipping luminance Ycp may be set to 4,000/8,000=5. The clipping luminance Ycp of the input luminance Yin may be set to the maximum luminance Ymax of the display device. The clipping luminance Ycp or the input luminance Yin greater than the maximum luminance Ymax is mapped to the maximum luminance Ymax of the display device.

The OETF processor 508 converts the luminance information Yout of each subpixel received from the luminance mapping unit 506 into the gray level information using the PQ-OETF which is the inverse function of the PQ-EOTF and then outputs the gray level information.

Figure 5:
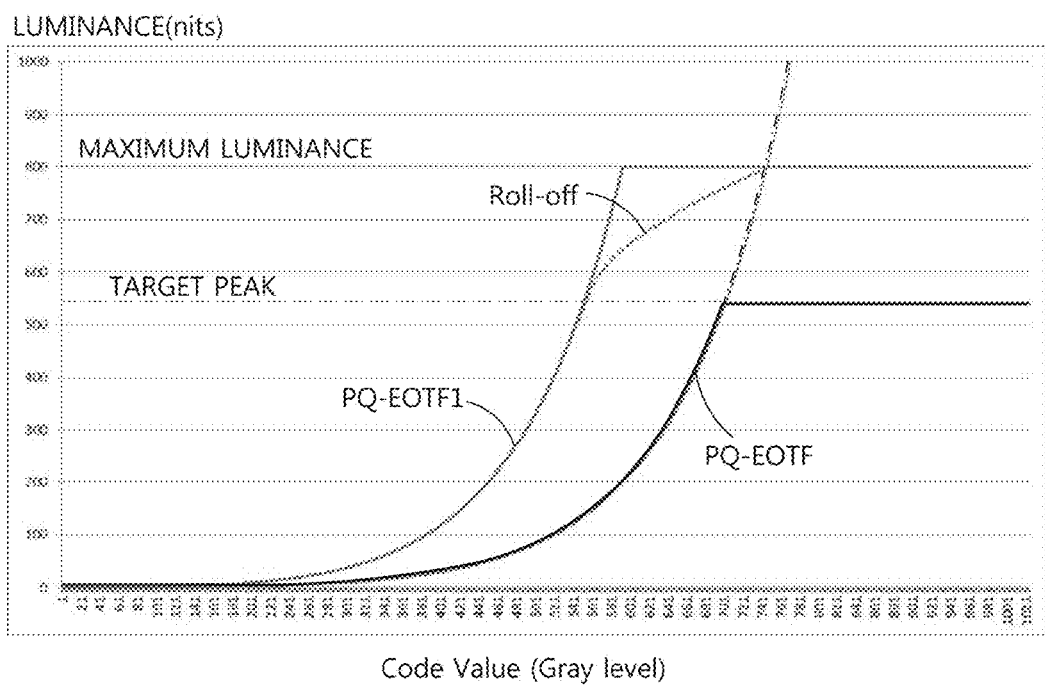
FIG. 5 is a diagram showing an image processing result of an HDR display device according to an embodiment of the present invention using a PQ-EOTF curve.

FIG. 5 is a diagram showing an image processing result of an HDR display device according to an embodiment of the present invention using a PQ-EOTF curve.

Referring to FIG. 5, the HDR display device may display the output luminance of the input gray level along the basic PQ-EOTF curve and represent the gray level up to the target peak luminance of the display device. In the case of applying the illuminance-based weight to adjust the PQ-EOTF curve, as the illuminance-based weight increases, the PQ-EOTF curve is shifted to the left. In the PQ-EOTF1 curve shifted based on the illuminance-based weight, it can be seen that the output luminance according to the gray level increases as compared to the basic PQ-EOTF curve. If the high-luminance rate of occupancy of the pixels exceeding the target peak luminance (e.g., 540 nits) of the display device in the HDR image exceeds the threshold TH, the target peak luminance gradually increases from the target peak luminance to the maximum luminance along a roll-off curve without saturation of the high gray level part corresponding to high luminance equal to or greater than the target peak luminance, thereby increasing distinguishability of the gray level of the HDR image and reducing luminance saturation.

Figure 6:
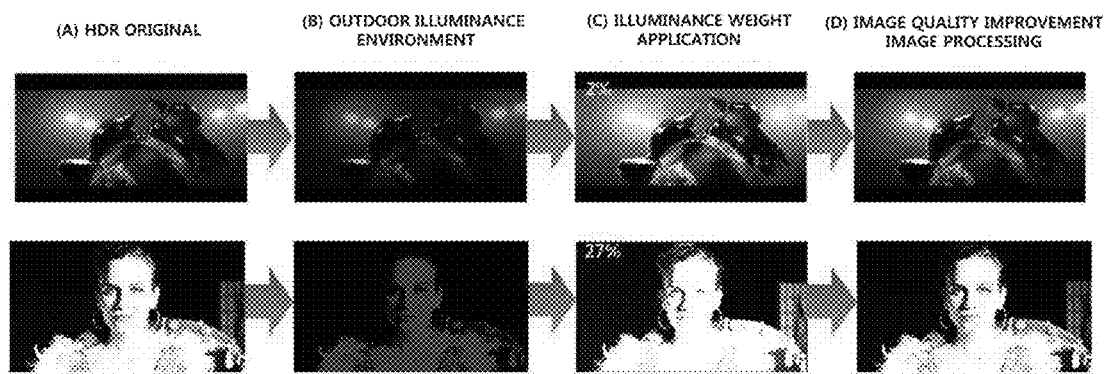
FIG. 6 is a diagram showing an image processing result when an HDR display device according to an embodiment of the present invention displays an HDR image having a high-luminance rate greater than a threshold.

FIG. 6 is a diagram showing an image processing result when an HDR display device according to an embodiment of the present invention displays an HDR image having a high-luminance rate greater than a threshold.

Referring to FIG. 6, in the HDR display device according to the embodiment, if an original HDR image a is displayed in a bright outdoor environment without applying the illuminance-based weight (b), visibility is deteriorated but, as a result (c) of adjusting the PQ-EOTF curve by applying the illuminance-based weight, visibility in the bright outdoor environment is improved. In addition, since the high-luminance rate (2% or 27%) of occupancy of pixels exceeding the target peak luminance (540 nits) of the display device in the image exceeds the threshold TH (1.5%), as a result d of performing the image processing procedure of increasing the luminance of the high-luminance (high gray level) part from the target peak luminance of the display device to the maximum luminance, visibility is improved and gray-level banding is reduced, thereby improving image quality.

Figure 7:
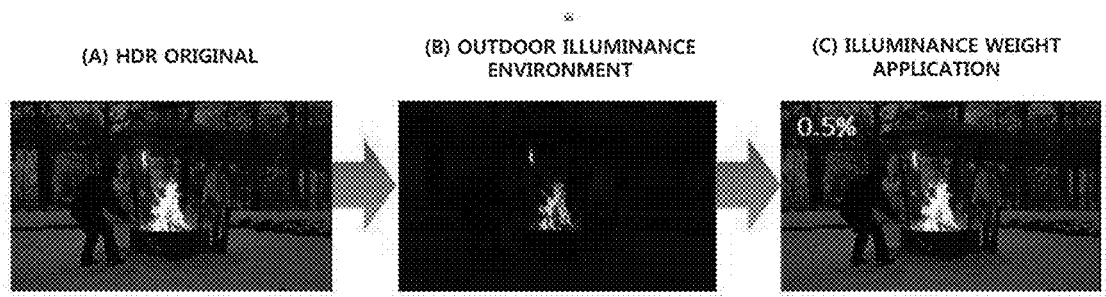
FIG. 7 is a diagram showing image processing effects when an HDR display device according to an embodiment of the present invention displays an HDR image having a high-luminance rate less than a threshold.

FIG. 7 is a diagram showing image processing effects when an HDR display device according to an embodiment of the present invention displays an HDR image having a high-luminance rate less than a threshold.

Referring to FIG. 7, in the HDR display device according to the embodiment, if an original HDR image a is displayed in a bright outdoor environment without applying the illuminance-based weight (b), visibility is deteriorated but, as a result (c) of adjusting the PQ-EOTF curve by applying the illuminance-based weight, visibility in the bright outdoor environment is improved. Since the high-luminance rate (0.5%) of the image is less than the threshold TH (1.5%), the image processing procedure of increasing luminance is not performed.

In the embodiment(s) of the present invention, the PQ-EOTF curve is adjusted according to illuminance to adjust the luminance of the HDR image, and, if the high-luminance rate of the adjusted HDR image is equal to or greater than the threshold, the luminance of the high-luminance part equal to or greater than the target peak luminance of the display device increases to increase gray-level distinguishability of the HDR image and to reduce luminance saturation, thereby improving visibility and image quality.

The display device according to the embodiment(s) of the present invention displays the HDR image with luminance equal to or less than the target peak luminance of the display device if the high-luminance rate of the HDR image adjusted according to illuminance is less than the threshold, thereby improving visibility and maintaining power consumption.

Those skilled in the art will appreciate that various modifications and applications are possible, without departing from the scope and spirit of the invention as disclosed in the accompanying claims. Further, the technical scope of the present invention is not-limited to the detailed description, but should be determined by the appended claims.

What is claimed is:
1. An image processing method comprising:
receiving illuminance information through an illuminance sensor;
converting gray level information of a first high dynamic range (HDR) image into luminance information using a perceptual quantizer electro-optical transfer function (PQ-EOTF), and adjusting the luminance information according to the illuminance information to obtain luminance information of a second HDR image;
analyzing the luminance information of the second HDR image, and calculating a high-luminance rate of occupancy of pixels having a target peak luminance or more of a display device in the second HDR image;
luminance-mapping the second HDR image to a third HDR image suitable for the display device using a mapping function changed according to the high-luminance rate; and
converting luminance information of the third HDR image into gray level information of a fourth HDR image using a perceptual quantizer opto-electrical transfer function (PQ-OETF), and outputting the gray level information of the fourth HDR image.

2. The method according to claim 1, wherein the second HDR image includes a first luminance part and a second luminance part, and
wherein, in the luminance-mapping,
when the high-luminance rate exceeds a threshold, a first linear mapping function is used in the first luminance part having the target peak luminance or less of the second HDR image and a second non-linear mapping function is used in the second luminance part having the target peak luminance or more, and
when the high-luminance rate is equal to or less than the threshold, the first mapping function is used.

3. The method according to claim 2, wherein:
when the high-luminance rate exceeds the threshold, luminance of the second luminance part of the second HDR image increases according to the second mapping function in a range between the target peak luminance of the display device and a maximum luminance of the display device, and when the high-luminance rate is equal to or less than the threshold, the second luminance part of the second HDR image is mapped to the target peak luminance.

4. The method according to claim 1, wherein the adjusting the luminance information according to the illuminance information includes:

selecting a weight according to the illuminance information; and applying the weight to the luminance information to obtain the luminance information of the second HDR image.

5. The method according to claim 4, further comprising: storing weight information in association with illuminances in a look-up table which is to be used when selecting the weight.

6. The method according to claim 1, wherein the display device is a liquid crystal display (LCD) device or an organic light emitting diode (OLED) display device.

7. An image processor comprising:

an electro-optical transfer function (EOTF) sub-processor configured to receive illuminance information through an illuminance sensor, convert gray level information of a first high dynamic range (HDR) image into luminance information using a perceptual quantizer electro-optical transfer function (PQ-EOTF), and adjust the luminance information according to the illuminance information to obtain luminance information of a second HDR image;

a luminance analyzing sub-processor configured to analyze the luminance information of the second HDR image to calculate a high-luminance rate of occupancy of pixels having a target peak luminance or more of a display device in the second HDR image;

a luminance mapping sub-processor configured to map the second HDR image to a third HDR image suitable for the display device using a mapping function changed according to the high-luminance rate; and an opto-electrical transfer function (OETF) sub-processor configured to convert the luminance information of the third HDR image into gray level information of a fourth HDR image using the PQ-OETF, and output the gray level information of the fourth HDR image.

8. The image processor according to claim 7, wherein the second HDR image includes a first luminance part and a second luminance part, and wherein the luminance mapping sub-processor:

uses a first linear mapping function in the first luminance part having the target peak luminance or less of the second HDR image and uses a second non-linear mapping function in the second luminance part having the target peak luminance or more, when the high-luminance rate exceeds a threshold, and uses the first mapping function when the high-luminance rate is equal to or less than the threshold.

9. The image processor according to claim 8, wherein the luminance mapping sub-processor:

increases luminance of the second luminance part of the second HDR image according to the second mapping function in a range between the target peak luminance of the display device and a maximum luminance of the display device, when the high-luminance rate exceeds the threshold, and maps the second luminance part of the second HDR image to the target peak luminance when the high-luminance rate is equal to or less than the threshold.

10. The image processor according to claim 8, wherein the luminance mapping sub-processor:

performs conversion into input luminance normalized by dividing the luminance information of the second HDR image by maximum luminance of the display device before luminance-mapping the second HDR image to the third HDR image, and maps the input luminance to normalized output luminance of the display device using the first or second mapping function.

11. The image processor according to claim 7, wherein the EOTF sub-processor adjusts the luminance information according to the illuminance information by selecting a weight according to the illuminance information and applying the weight to the luminance, so as to obtain the luminance information of the second HDR image.

12. The image processor according to claim 11, further comprising:

a memory configured to store weight information in association with illuminances in a look-up table which is to be used when selecting the weight.

13. The image processor according to claim 7, wherein the image processor is provided as part of a timing controller of the display device.

14. A display device comprising:

a display panel;

an image processor; and a display panel driver configured to drive the display panel to display a high dynamic range (HDR) image received from the image processor, wherein the image processor comprises:

an electro-optical transfer function (EOTF) sub-processor configured to receive illuminance information through an illuminance sensor, convert gray level information of a first HDR image into luminance information using a perceptual quantizer electro-optical transfer function (PQ-EOTF), and adjust the luminance information according to the illuminance information to obtain luminance information of a second HDR image;

a luminance analyzing sub-processor configured to analyze the luminance information of the second HDR image to calculate a high-luminance rate of occupancy of pixels having target peak luminance or more of the display device in the second HDR image;

a luminance mapping sub-processor configured to map the second HDR image to a third HDR image suitable for the display device using a mapping function changed according to the high-luminance rate; and an opto-electrical transfer function (OETF) sub-processor configured to convert the luminance information of the third HDR image into gray level information of a fourth HDR image using the PQ-OETF and to output the gray level information of the fourth HDR image.

15. The display device according to claim 14, wherein the second HDR image includes a first luminance part and a second luminance part, and wherein the luminance mapping sub-processor:

uses a first linear mapping function in the first luminance part having the target peak luminance or less of the second HDR image and uses a second non-linear mapping function in the second luminance part having the target peak luminance or more, when the high-luminance rate exceeds a threshold, and uses the first mapping function when the high-luminance rate is equal to or less than the threshold.

16. The display device according to claim 15, wherein the luminance mapping sub-processor:
increases luminance of the second luminance part of the second HDR image according to the second mapping function in a range between the target peak luminance of the display device and a maximum luminance of the display device, when the high-luminance rate exceeds the threshold, and
maps the second luminance part of the second HDR image to the target peak luminance when the high-luminance rate is equal to or less than the threshold.

17. The display device according to claim 15, wherein the luminance mapping sub-processor:
performs conversion into input luminance normalized by dividing the luminance information of the second HDR image by maximum luminance of the display device before luminance-mapping the second HDR image to the third HDR image, and
maps the input luminance to normalized output luminance of the display device using the first or second mapping function.

18. The display device according to claim 14, wherein the EOTF sub-processor adjusts the luminance information according to the illuminance information by selecting a weight according to the illuminance information and applying the weight to the luminance, so as to obtain the luminance information of the second HDR image.

19. The display device according to claim 18, wherein the image processor is provided as part of a timing controller of the display device, or as an integrated circuit separate from the timing controller.

20. The display device according to claim 14, wherein the display panel is a liquid crystal display (LCD) panel or an organic light emitting diode (OLED) panel.

* * * * *